(12) United States Patent
Harugaichi et al.

(10) Patent No.: US 12,187,111 B2
(45) Date of Patent: Jan. 7, 2025

(54) LOWER STRUCTURE FOR VEHICLE

(71) Applicant: Mazda Motor Corporation, Hiroshima (JP)

(72) Inventors: Shintaro Harugaichi, Hiroshima (JP); Daisuke Sakagami, Hiroshima (JP); Sho Yoshida, Hiroshima (JP); Daisuke Tsuji, Hiroshima (JP); Shuang Gao, Hiroshima (JP); Yoshie Nishimoto, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 433 days.

(21) Appl. No.: 17/738,006

(22) Filed: May 6, 2022

(65) Prior Publication Data
US 2022/0379707 A1  Dec. 1, 2022

(30) Foreign Application Priority Data
May 25, 2021   (JP) .................... 2021-087357

(51) Int. Cl.
*B60K 1/04* (2019.01)
*B62D 21/15* (2006.01)
*B62D 25/20* (2006.01)

(52) U.S. Cl.
CPC .............. *B60K 1/04* (2013.01); *B62D 21/157* (2013.01); *B62D 25/2036* (2013.01); *B60K 2001/0438* (2013.01)

(58) Field of Classification Search
CPC .............. B60K 1/04; B60K 2001/0438; B60K 17/356; B60K 2001/005; B60K 7/0007; B60K 2001/0416; B60K 6/28; B60L 50/66; B60L 3/0007; B60L 3/0046; B60L 50/64; B60L 2270/145; B60R 16/04; B60Y 2306/01; B62D 21/157; B62D 25/2036
USPC ....................................................... 180/68.5
See application file for complete search history.

(56) References Cited

U.S. PATENT DOCUMENTS

| | | | | |
|---|---|---|---|---|
| 2014/0322568 A1* | 10/2014 | Sakai | ................... | H01M 50/298 429/150 |
| 2015/0174996 A1* | 6/2015 | Ikeda | ................... | H01M 8/2465 180/68.5 |
| 2017/0232866 A1* | 8/2017 | Sugizaki | ............... | B60L 3/0007 180/242 |
| 2017/0232913 A1* | 8/2017 | Fukazu | ................... | B60L 50/60 307/10.1 |
| 2020/0023905 A1* | 1/2020 | Kawase | ............... | B62D 25/025 |

(Continued)

FOREIGN PATENT DOCUMENTS

JP    2020-11640 A    1/2020

*Primary Examiner* — James A Shriver, II
*Assistant Examiner* — Hilary L Johns
(74) *Attorney, Agent, or Firm* — XSENSUS LLP

(57) ABSTRACT

A lower structure for a vehicle includes a battery unit which is provided under a vehicle body floor, a frame member which extends in a front-rear direction on a vehicle-width-direction outer side of the battery unit, a high-voltage cable which extends forward from a front portion of the battery unit, and a fixing member which fixes a rear portion of the battery unit to the frame member, and the fixing member is configured to be fractured when an inward collision load in a vehicle width direction is input to a position in front of a position of a center of gravity of a first battery unit.

8 Claims, 10 Drawing Sheets

(56) References Cited

U.S. PATENT DOCUMENTS

2022/0379707 A1* 12/2022 Harugaichi ........ B62D 25/2036
2023/0347726 A1* 11/2023 Oishi ....................... B60K 1/04

* cited by examiner

LOWER STRUCTURE FOR VEHICLE

CROSS-REFERENCE TO RELATED APPLICATION

The present application claims priority to Japanese Patent Application 2021-087357, filed May 25, 2021, the entire contents of which are incorporated herein by reference.

TECHNICAL FIELD

The present disclosure relates to a lower structure for a vehicle in which a battery unit is installed under a floor.

BACKGROUND

As disclosed in Patent Literature 1, a BEV (battery electric vehicle) structure has been conventionally known which is configured such that a battery unit is arranged under a vehicle floor and side sills as vehicle body strengthening members positioned on both of left and right sides in a vehicle width direction of a floor panel absorb side collision load energy in a side collision of a vehicle.

In a case of a PHEV (plug-in hybrid electric vehicle) vehicle among vehicles with BEV structures, an engine installed in a front portion of a vehicle is used for electricity generation or driving. Thus, in a PHEV vehicle, owing to the fact that an exhaust pipe is arranged which extends from an engine to a vehicle rear area along a floor tunnel extending in a front-rear direction under a vehicle floor, battery units have to be arranged to be spaced apart from each other on left and right sides in a vehicle width direction across the floor tunnel.

In a case where such a structure is employed, when an inward collision load in the vehicle width direction is input to a vehicle front area relative to the position of the center of gravity of the battery unit as in a pole side collision or the like, the side sill deforms in a V-shape in a vehicle planar view, a side collision load is input from a local section in front of the position of the center of gravity to the battery unit, and behavior occurs where a front area of the battery unit is subjected to rotational displacement to a vehicle-width-direction inner side.

In a case where a high-voltage cable is present which couples the above-described battery unit with a high-voltage device such as an inverter in front of the battery unit, there is concern that the high-voltage cable is strongly pulled in the rotational displacement of the front area of the battery unit to the vehicle-width-direction inner side.

In order to avoid such concern, it is possible to set the length of the high-voltage cable sufficiently long, but when the high-voltage cable is elongated, another problem occurs that an electric resistance becomes larger by the amount of elongation.

[Patent Literature 1] Japanese Patent Laid-Open No. 2020-11640

SUMMARY

Problems to be Solved

The present disclosure has been made in consideration of such problems, and an object thereof is to provide a lower structure for a vehicle which inhibits rotation behavior of a battery unit in a side collision and can thereby inhibit an excessive tension from being exerted on a high-voltage cable without elongating a length of the high-voltage cable.

Solutions for Solving the Problems

A lower structure for a vehicle of the present disclosure includes: a battery unit which is provided under a floor panel constituting a vehicle body floor; a frame member which extends in a front-rear direction on a vehicle-width-direction outer side of the battery unit; a high-voltage cable which extends forward from a front portion of the battery unit; and a fixing member which fixes a rear portion of the battery unit to the frame member, and is characterized in that the fixing member is configured to be capable of being fractured when an inward collision load in a vehicle width direction is input to a position in front of a position of a center of gravity of the battery unit.

With the above configuration, when an inward collision load in the vehicle width direction, that is, a side collision load is input to the front position of the battery unit, behavior occurs where the frame member is subjected to bending deformation to a vehicle-width-direction inner side and the front portion of the battery unit is pushed into the vehicle-width-direction inner side; however, because the fixing member is fractured, rotation behavior can be inhibited where the front portion of the battery unit is largely displaced to the vehicle-width-direction inner side following the deformation of the frame member.

Consequently, in a side collision, an excessive tension can be inhibited from being exerted on the high-voltage cable, which extends forward, in response to the above-described rotation behavior of the battery unit. In addition, because the high-voltage cable does not have to be formed excessively long with respect to an actual length, an increase in an electric resistance of the high-voltage cable can be inhibited.

As an aspect of this disclosure, the frame member is a side sill which extends in the front-rear direction on the vehicle-width-direction outer side of the floor panel.

With the above configuration, even when the side sill is subjected to bending deformation to the vehicle-width-direction inner side in a side collision, the fixing member fixed to the side sill is fractured. Thus, the above-described rotation behavior can be inhibited where the battery unit is displaced following the deformation of the side sill.

As an aspect of this disclosure, the lower structure for a vehicle includes: a side sill which extends in the front-rear direction on the vehicle-width-direction outer side of the floor panel; and a floor frame and a rear side frame which are adjacent to the side sill on a vehicle-width-direction inner side and extend in the front-rear direction, wherein the floor frame is provided in front of the rear side frame, a rear portion of the floor frame and a front portion of the rear side frame are joined to each other, and the frame member is at least one of the floor frame and the rear side frame.

With the above configuration, even when the side sill is subjected to bending deformation to the vehicle-width-direction inner side in a side collision, the fixing member fixed to at least one of the floor frame and the rear side frame is fractured. Thus, the above-described rotation behavior can be inhibited where the battery unit is displaced following the deformation of the side sill.

As an aspect of this disclosure, the fixing member may be configured to have a vehicle-body fastening portion, first and second battery fastening portions which are spaced apart in the front-rear direction, and a hole portion which is formed between the first battery fastening portion and the second battery fastening portion.

With the above configuration, a load transmission path of a load transmitted from the vehicle-body fastening portion to a battery side can be divided into both sides across the hole portion provided between the first battery fastening portion and the second battery fastening portion. Thus, a load input from a vehicle body to the fixing member via the vehicle-body fastening member in a side collision can be concentrated in the vicinities of the first and second battery fastening portions.

Consequently, in a side collision, the vicinity of the first battery fastening portion and the vicinity of the second battery fastening portion can certainly be fractured.

As an aspect of this disclosure, the first battery fastening portion may be configured to be positioned in front of the second battery fastening portion, and a front-rear direction length between the vehicle-body fastening portion and the first battery fastening portion may be configured to be longer than a front-rear direction length between the vehicle-body fastening portion and the second battery fastening portion.

With the above configuration, because the front-rear direction length (moment length) between the vehicle-body fastening portion and the first battery fastening portion is longer than the front-rear direction length (moment length) between the vehicle-body fastening portion and the second battery fastening portion, in a side collision, a moment load can more be concentrated in the vicinity of the first battery fastening portion than the vicinity of the second battery fastening portion.

Consequently, the vicinity of the first battery fastening portion and the vicinity of the second battery fastening portion can stepwise be fractured in this order, and as a result, both of the vicinity of the first battery fastening portion and the vicinity of the second battery fastening portion can certainly be fractured.

As an aspect of this disclosure, the second battery fastening portion may be configured to be positioned below the first battery fastening portion.

With the above configuration, a desired fracturing line in which the fixing member is desired to be fractured in a side collision is a line which linearly connects together the respective vicinities in the first battery fastening portion and the second battery fastening portion to the vehicle-body fastening portion side. As described above, the second battery fastening portion is positioned below the first battery fastening portion, and the fixing member can thereby be configured such that a fastening member is not provided at a position on the vehicle-body fastening portion side of the fracturing line. Accordingly, in a rear-side bracket, stress input from the vehicle-body fastening portion in a side collision is not dispersed to the fastening portion positioned on the vehicle-body fastening portion side of the fracturing line, but stress can be concentrated in the first battery fastening portion.

As an aspect of this disclosure, a configuration may be made in which a strength lowered portion is provided in a vicinity in the first battery fastening portion to a side of the vehicle-body fastening portion.

With the above configuration, the strength lowered portion is provided in the vicinity of the first battery fastening portion on a side collision load transmission path from the vehicle-body fastening portion to the first battery fastening portion, the vicinity of the first battery fastening portion can thereby certainly be fractured in a side collision, and a section to be fractured can be controlled.

As an aspect of this disclosure, the strength lowered portion is a section in a load transmission path which connects the vehicle-body fastening portion and the first battery fastening portion in a shortest length, the section being formed to have a smallest path width and/or a thinnest thickness.

With the above configuration, in a side collision, the vicinity of the first battery fastening portion can certainly and easily be fractured, and a section to be fractured can easily be controlled.

As an aspect of this disclosure, the fixing member may be configured to include a flange portion which is formed to bend with respect to the load transmission path along at least one edge portion of the load transmission path in a path width direction, and an end portion in the flange portion on a side of the first battery fastening portion may be configured to be positioned in a vicinity of the strength lowered portion.

With the above configuration, because, in the load transmission path, a rigidity difference is present between the vicinity of the first battery fastening portion and the other portions, in a side collision, the vicinity of the first battery fastening portion can certainly be fractured.

Further, durability (rigidity) against a vibration input from the battery in usual traveling can be enhanced.

Consequently, achievement of both of certain fracture of the vicinity of the first battery fastening portion in a side collision and durability against a vibration input from the battery in usual traveling can be intended.

Note that the path width direction denotes a direction orthogonal to the load transmission path connecting the fastening portions together in a side view.

With one or more of the above configuration, by inhibiting rotation behavior of a battery unit in a side collision, an excessive tension is inhibited from being exerted on a high-voltage cable without elongating a length of the high-voltage cable.

DETAILED DESCRIPTION

Figure 1:
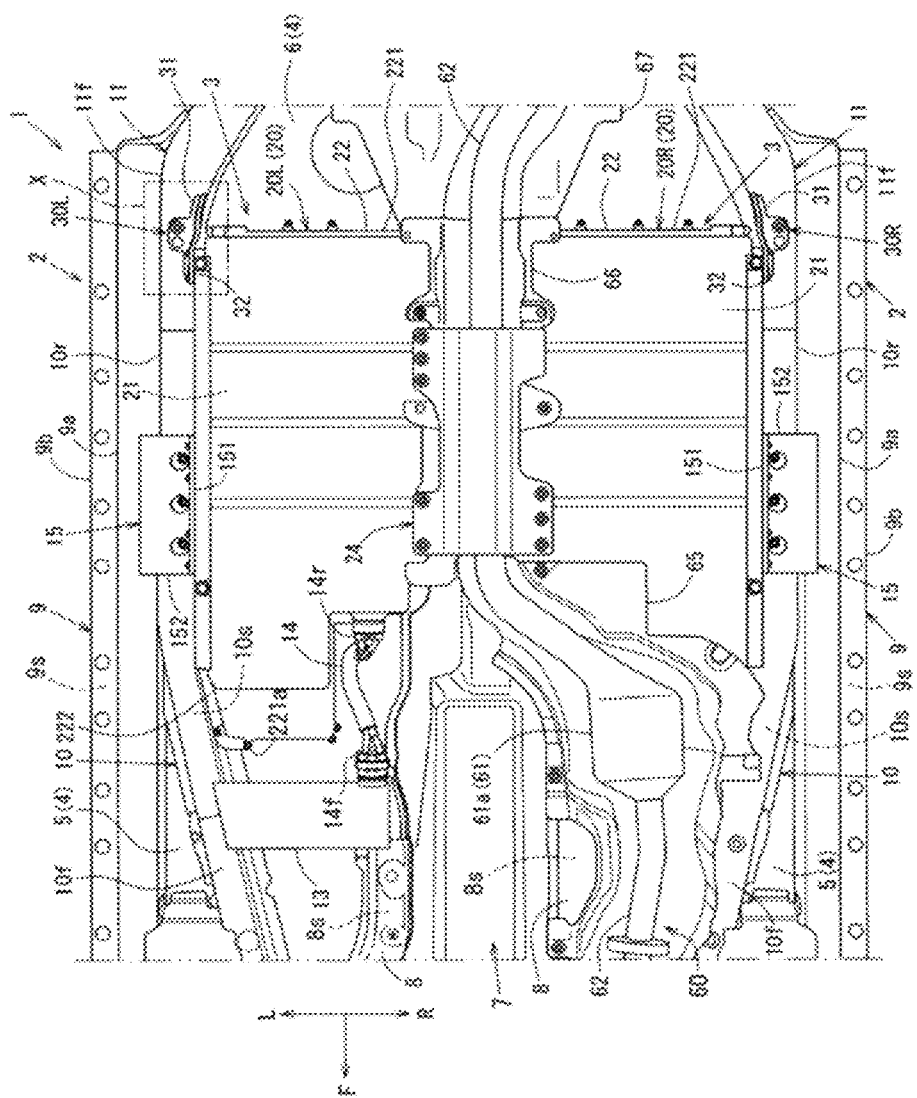
FIG. 1 is a bottom view illustrating a lower structure for a vehicle according to one or more aspects of the disclosed subject matter.

A lower structure for a vehicle 1 of the present disclosure will hereinafter be described with reference to drawings, the lower structure being applied as an embodiment of the present disclosure to a plug-in hybrid automobile (PHEV).

Further, in the drawings, an arrow F indicates a front direction of the vehicle 1, an arrow R indicates a right direction of the vehicle 1, an arrow L indicates a left direction of the vehicle 1, and an arrow U indicates an upper direction of the vehicle.

Figure 2:
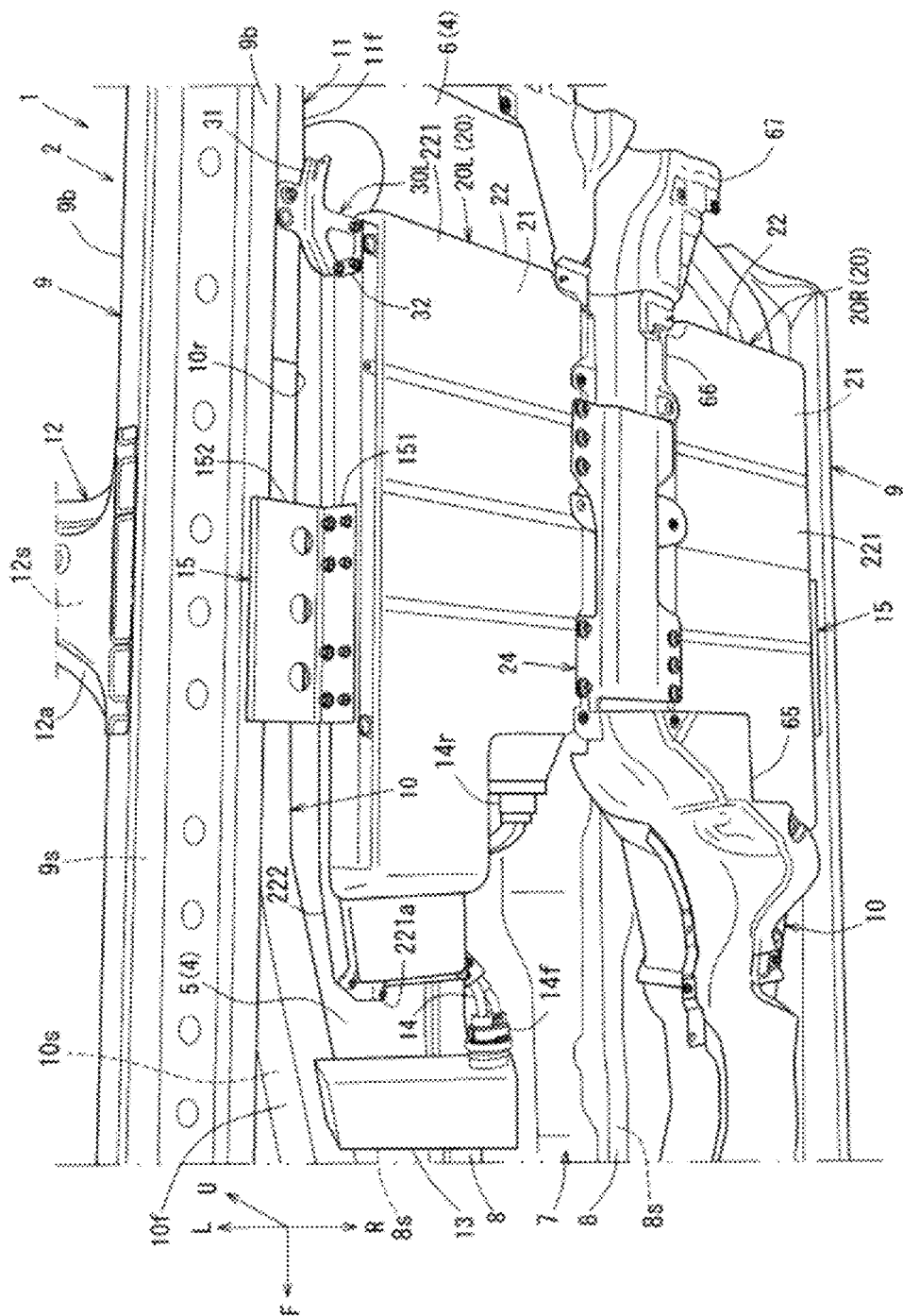
FIG. 2 is a perspective view of the lower structure for a vehicle as seen from a vehicle left area and below.

As illustrated in FIG. 1 and FIG. 2, the vehicle 1 of the present disclosure is configured to include a vehicle body 2, battery units 20 disposed under a floor of the vehicle body 2, and so forth.

Note that in the vehicle body 2, in front of a vehicle cabin, a power unit room is provided which houses a power unit configured with an engine, a motor, and so forth appropriately used for electricity generation or driving.

As illustrated in FIG. 1 and FIG. 2, in a lower portion of the vehicle cabin of in the vehicle body 2, a floor panel 4 constituting a vehicle body floor is disposed.

The floor panel 4 includes a front floor panel 5 and a rear floor panel 6, and the front floor panel 5 and the rear floor panel 6 are joined together to be continuous with each other between front and rear sides via a kick-up portion which is.

In the front floor panel 5, a tunnel portion 7 (also referred to as "floor tunnel 7") is integrally or substantially integrally formed which swells upward (toward the vehicle cabin) in a vehicle-width-direction center portion and is provided to extend in a front-rear direction of the vehicle 1.

This tunnel portion 7 serves as a center of vehicle body rigidity and is formed in the front-rear direction throughout substantially the whole length of the floor panel 4.

As illustrated in FIG. 1 and FIG. 2, left and right tunnel side members 8 are provided which extend in the front-rear direction of the vehicle body 2 along both of left and right lower edges of the tunnel portion 7 under the floor panel 4. Closed cross-sections 8s extending in the front-rear direction of the vehicle 1 are respectively formed between the tunnel side members 8 and the above-described floor panel 4.

Further, as illustrated in FIG. 1 and FIG. 2, side sills 9 extending in the front-rear direction are connected with both outer sides (both of left and right sides) of the above-described floor panel 4 in its width direction. The side sill 9 is a frame member in which a side sill inner 9*a* (see FIG. 1) and a side sill outer 9*b* are joined together and which has a closed cross-section 9s extending throughout substantially the whole length of the floor panel 4 in the front-rear direction.

Floor frames 10 as left and right frame members which protrude downward and extend in the front-rear direction are provided under the floor panel 4 and between side ends of the floor panel 4 and the tunnel portion 7, specifically between the side sill inners 9*a* and the tunnel side members 8. A closed cross-section 10s extending in the front-rear direction is formed between the floor frame 10 and the floor panel 4.

A rear portion 10*r* of the floor frame 10 is adjacent to the side sill 9 on an inner side in a vehicle width direction and extends in the front-rear direction substantially in parallel with the side sill 9.

As described above, the rear floor panel 6 is disposed in the rear of the front floor panel 5. On both outer sides of the rear floor panel 6 in the vehicle width direction, rear side frames 11 are disposed which extend in the front-rear direction of the vehicle 1. A front portion 11*f* of the rear side frame 11 extends forward to a vehicle-width-direction outer side of a rear portion of the front floor panel 5. That is, the front portion 11*f* of the rear side frame 11 is adjacent to a rear portion of the side sill 9 on the inner side in the vehicle width direction and extends in the front-rear direction substantially in parallel with the side sill 9. Furthermore, a front end of the rear side frame 11 is joined to a back end of the floor frame 10.

Front portions 10*f* of the floor frames 10 are inclined and linearly extend to be positioned vehicle-width-direction inner sides toward the front, and front ends of the front portions 10*f* are joined to back ends of front side frames as frame members which extend in the front-rear direction on both sides of the power unit room provided in front of the vehicle cabin in the vehicle body 2.

Further, as illustrated in FIG. 2, in an intermediate position of the side sill 9 in the front-rear direction, a center pillar 12 (the center pillar 12 on a left side of the vehicle body 2 is illustrated) is provided which extends upward from the intermediate position. The center pillar 12 is a frame member which includes a center pillar outer 12*a* and a center pillar inner and in which a closed cross-section 12s extending in an up-down direction is formed.

Further, an exhaust apparatus 60 (see FIG. 1) is connected, via an exhaust manifold, with exhaust ports provided to the engine installed in front of the vehicle cabin in the vehicle body 2. The exhaust apparatus 60 is disposed to be continuous in the front-rear direction of the vehicle 1 in a lower position than a lower end of the floor panel 4.

As illustrated in FIG. 1, the exhaust apparatus 60 includes various kinds of exhaust system members 61, such as a catalytic unit, a silencer, and a tail pipe, and includes exhaust pipes 62 which are arranged among the various kinds of exhaust system members 61 and connect together the exhaust system members 61 neighboring in the front-rear direction.

A reference character 61*a* in the drawings denotes the catalytic unit among the exhaust system members 61. Further, FIG. 2 does not illustrate the exhaust apparatus 60.

The exhaust apparatus 60 formed with those elements is disposed to be continuous in the front-rear direction of the vehicle 1 in a lower position than the lower end of the floor panel 4.

Specifically, as illustrated in FIG. 1, the exhaust apparatus 60 is routed to make a detour on one side (the right side in this example) of vehicle-width-direction outer sides of the tunnel portion 7 in a front portion of the front floor panel 5 and in a rear portion of the rear floor panel 6 in the front-rear direction. Meanwhile, the exhaust apparatus 60 is routed immediately below the tunnel portion 7 in the rear portion of the front floor panel 5 in the front-rear direction.

Under the floor panel 4, insulators 65, 66, and 67 are disposed along the longitudinal direction (exhaust path) of the exhaust apparatus 60. The insulators 65, 66, and 67 are formed in shapes protruding upward such that their orthogonal cross-sections in the longitudinal direction of the exhaust apparatus 60 open downward. Furthermore, the insulators 65, 66, and 67 house the exhaust apparatus 60 in their internal portions to prevent a periphery from being damaged by heat of the exhaust apparatus 60.

As the insulators 65, 66, and 67, a front portion insulator 65, an intermediate portion insulator 66, and a rear portion insulator 67 are provided. Those insulators 65, 66, and 67 are formed while being divided from each other and are mounted on the vehicle body 2 in a state where those are coupled together to be continuous in the front-rear direction.

As illustrated in FIG. 1 and FIG. 2, the battery units 20 are disposed on lower sides of the rear portion of the front floor panel 5.

However, as in the vehicle 1 of the present disclosure, in a plug-in hybrid vehicle (PHEV) which is capable of being charged with electrical energy directly from a commercial electric outlet, because a battery is large-sized and has a large capacity, to handle this, the battery units 20 are disposed while being spaced apart from each other on left and right sides across the tunnel portion 7 on the lower side of the floor panel 4.

Here, of the battery units 20 on the left and right sides, a battery unit 20L on the left side will also be referred to as "a first battery unit 20L", and the right battery unit 20 on the right side will also be referred to as "a second battery unit 20R".

Note that the first battery unit 20L and the second battery unit 20R are spaced apart from each other on the left and right sides across the tunnel portion 7 but are electrically connected with each other.

As illustrated in FIG. 1 and FIG. 2, each of the first and second battery units 20L and 20R is configured as a battery pack which has a battery module 21 (battery module) and a battery case 22 as a battery case for housing the battery module 21. The vehicle 1 travels by using electrical energy stored in the battery modules 21 housed in the battery cases 22 in addition to drive by the engine.

In one or more aspects of the disclosed subject matter, the battery module 21 is configured in a state where plural battery cells, which are formed into flat plate shapes extending in the up-down direction and the front-rear direction, are stacked in the vehicle width direction. For example, the battery cell is a secondary battery such as a lithium-ion battery and a nickel-metal hydride battery.

The battery case 22 is formed into a box shape with a tray 221 which supports the battery module 21 from a lower side and a lid 222 (the lid 222 on the left side of the vehicle 1 is illustrated) which covers the battery module 21 from above. A flange portion 221a is formed in an outer peripheral edge of the tray 221 in a planar view, and the flange portion 221a is fastened to an outer peripheral edge of the lid 222 in a planar view in a state where the battery module 21 is housed in an internal portion.

Further, as illustrated in FIG. 1 and FIG. 2, the first and second battery units 20L and 20R are disposed on the vehicle-width-direction inner sides of the rear portions 10r of the floor frame 10 and the front portions 11f of the rear side frames 11, the rear portions 10r and front portions 11f respectively corresponding to the battery units 20L and 20R on the left and right, and on the vehicle-width-direction outer sides of the tunnel portion 7.

Further, each of the first and second battery units 20L and 20R is fastened and fixed to plural frame members, around which the battery case 22 is disposed and which will be described later, through plural parts by using bolts and so forth, via brackets 15, 30, and so forth.

Specifically, on the vehicle-width-direction inner side, each of the first and second battery units 20L and 20R is fixed to the tunnel portion 7 as a frame member, which is adjacent thereto on the vehicle-width-direction inner side, via a bracket.

Meanwhile, on the vehicle-width-direction outer sides, both of the first and second battery units 20L and 20R are fixed to the rear portions 10r of the floor frames 10 as frame members, which are adjacent thereto on the vehicle-width-direction outer sides, via the intermediate brackets 15 and are fixed to the front portions 11f of the rear side frames 11 via rear-side brackets 30L and 30R. Specific structures of the above-described intermediate bracket 15 and rear-side brackets 30L and 30R will be described later.

Further, the above-described intermediate portion insulator 66 is positioned between the first and second battery units 20L and 20R below the tunnel portion 7. Furthermore, as illustrated in FIG. 1 and FIG. 2, below the above-described intermediate portion insulator 66 and between the first and second battery units 20L and 20R, a coupling member 24 is disposed which couples those first and second battery units 20L and 20R with each other.

Specifically, the coupling member 24 extends in the vehicle width direction so as to close, from below, the intermediate portion insulator 66 opening downward and couples together, in the vehicle width direction, a vehicle-width-direction inner side of a bottom surface of the first battery unit 20L and a vehicle-width-direction inner side of a bottom surface of the second battery unit 20R.

Below a front portion of the floor panel 4, that is, in front of the first battery unit 20L, the inverter 13 as a high-voltage device is provided.

The inverter 13 is a conversion device which performs mutual conversion between power of a direct-current circuit in which the battery units 20 are interposed and power of an alternating-current circuit in which a motor is interposed.

The inverter 13 is arranged between a front portion of the floor frame 10 and a front portion of the tunnel side member 8 on one side (the left side of the vehicle 1 in this example) in the vehicle width direction and is attached and fixed to the front portion 10f of the floor frame 10 and the front portion of the tunnel side member 8.

The first battery unit 20L and the inverter 13 are coupled with each other via a high-voltage cable 14 (high-voltage harness). In the present embodiment, as for the high-voltage cable 14, a front-side plug 14f is connected with a rear portion of the inverter 13, a rear-side plug 14r is connected with a front portion of the first battery unit 20L (specifically, a portion in front of the position of the center of gravity of the first battery unit 20L), and the high-voltage cable 14 extends in a substantially front-rear direction between the front portion of the first battery unit 20L and the rear portion of the inverter 13.

Accordingly, when the motor is driven, alternating-current driving electric power is supplied from the first and second battery units 20L and 20R side to the motor side via the high-voltage cable 14. When the motor generates electricity, direct-current charging electric power is supplied from the motor side to the first and second battery units 20L and 20R side via the high-voltage cable 14.

Note that front areas of the battery units 20 around a lower surface of the floor panel 4 are covered by undercovers. The undercovers are respectively provided to a region on one side and a region on the other side in the vehicle width direction with respect to the insulator 65, the regions being on a lower side of the front portion of the floor panel 4. Both of the pair of undercovers are arranged at heights substantially flush with lower surfaces of the battery units 20 and with a lower end of the insulator 65, and portions of the undercovers are joined to the lower surfaces of the battery units 20 and the lower end of the insulator 65, the portions being adjacent to those.

Further, as illustrated in FIG. 1 and FIG. 2, as for the above-described intermediate bracket 15, the pair of left and right intermediate brackets 15 are provided, and both of those are provided in the positions corresponding to the center pillars 12 (see FIG. 2) (substantially intermediate positions of the side sills 9 in the front-rear direction) in the front-rear direction and on the vehicle-width-direction outer sides respectively corresponding to the first and second battery unit 20L and 20R. The intermediate bracket 15 is formed into a general L-shape with a battery-side mounting piece 151 which extends in the up-down direction in an orthogonal cross-sectional view to the front-rear direction and a vehicle-body-side mounting piece 152 which extends from a lower portion of the battery-side mounting piece 151 to the vehicle-width-direction outer side.

Furthermore, in the intermediate bracket 15, the battery-side mounting piece 151 is fastened and fixed to a side surface of the battery case 22 on the vehicle-width-direction outer side by bolts and so forth, and the vehicle-body-side mounting piece 152 is fastened and fixed to the rear portion 10r of the floor frame 10 by bolts and so forth.

Further, the above-described rear-side brackets 30L and 30R are provided on left and right sides, and each of those is a bracket which fixes the battery case 22 to the vehicle body 2 (a bottom face portion of the front portion 11f of the rear side frame 11) in a rear portion (specifically, a rear area relative to the position of the center of gravity of the battery case 22) and on a side surface of the battery case 22 on the vehicle-width-direction outer side and is formed by performing a bending process for a steel plate or the like by press molding or the like.

Between the pair of left and right rear-side brackets 30L and 30R, the rear-side bracket 30L on a vehicle left side is a bracket which fixes a rear portion of the first battery unit 20L to the vehicle body 2 (the bottom face portion of the front portion 11f of the rear side frame 11) from the vehicle-width-direction outer side and corresponds to a fixing member of the present disclosure.

This rear-side bracket 30L is configured to be capable of being fractured when an inward collision load in the vehicle width direction is input from the left side of the vehicle 1 to a position in front of the position of the center of gravity of the first battery unit 20L (for example, the position corresponding to the center pillar 12 in the front-rear direction) (in other words, when a side collision from the left side of the vehicle 1 occurs).

Meanwhile, between the pair of left and right rear-side brackets 30L and 30R, the rear-side bracket 30R on a vehicle right side is formed stronger than the rear-side bracket 30L on the vehicle left side while priority is given to durability (rigidity) against a vibration input from the second battery unit 20R in usual traveling.

In the following, a configuration of the rear-side bracket 30L on the vehicle left side will be described.

Figure 3:
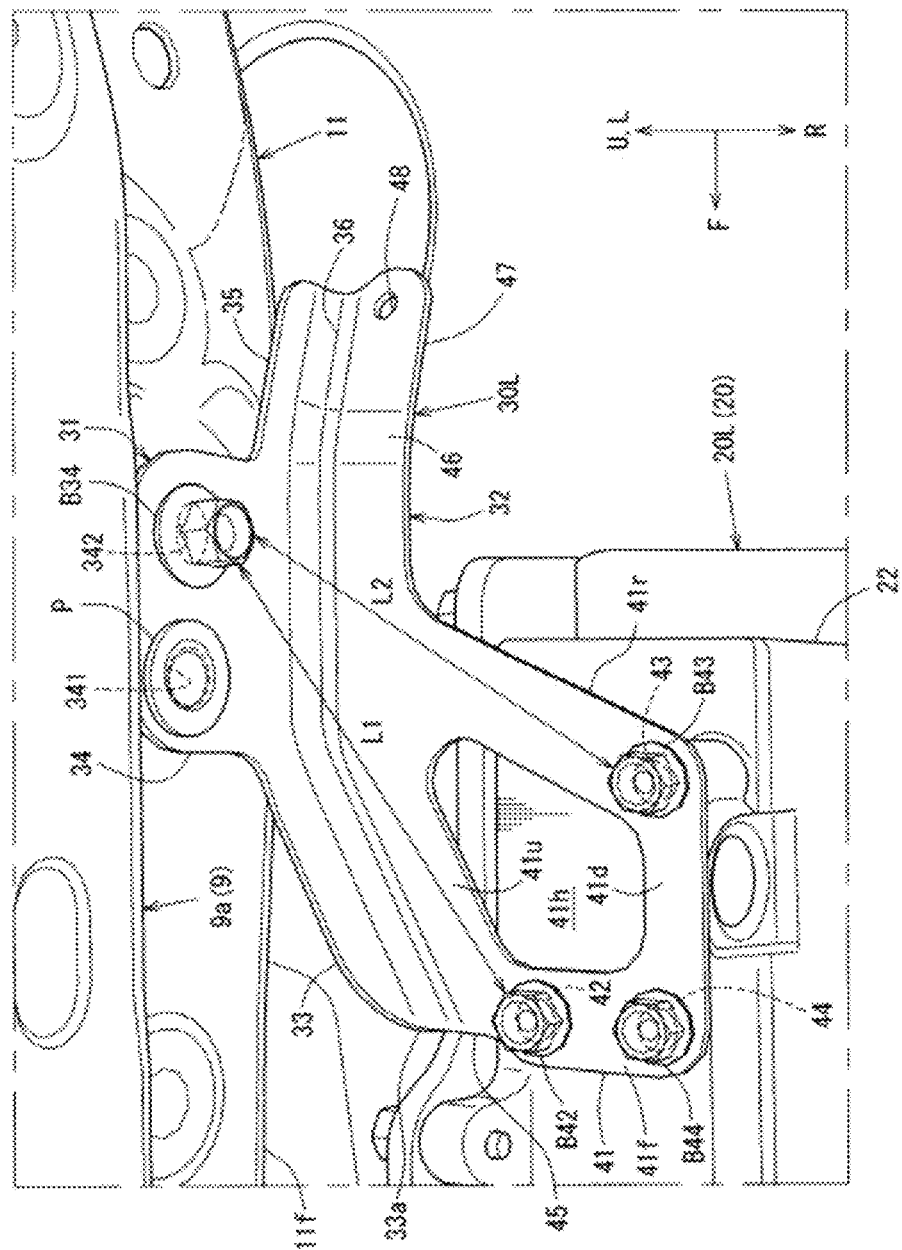
FIG. 3 is a perspective view of a rear-side bracket and its periphery as seen from below and a vehicle-width-direction outer side.
Figure 4:
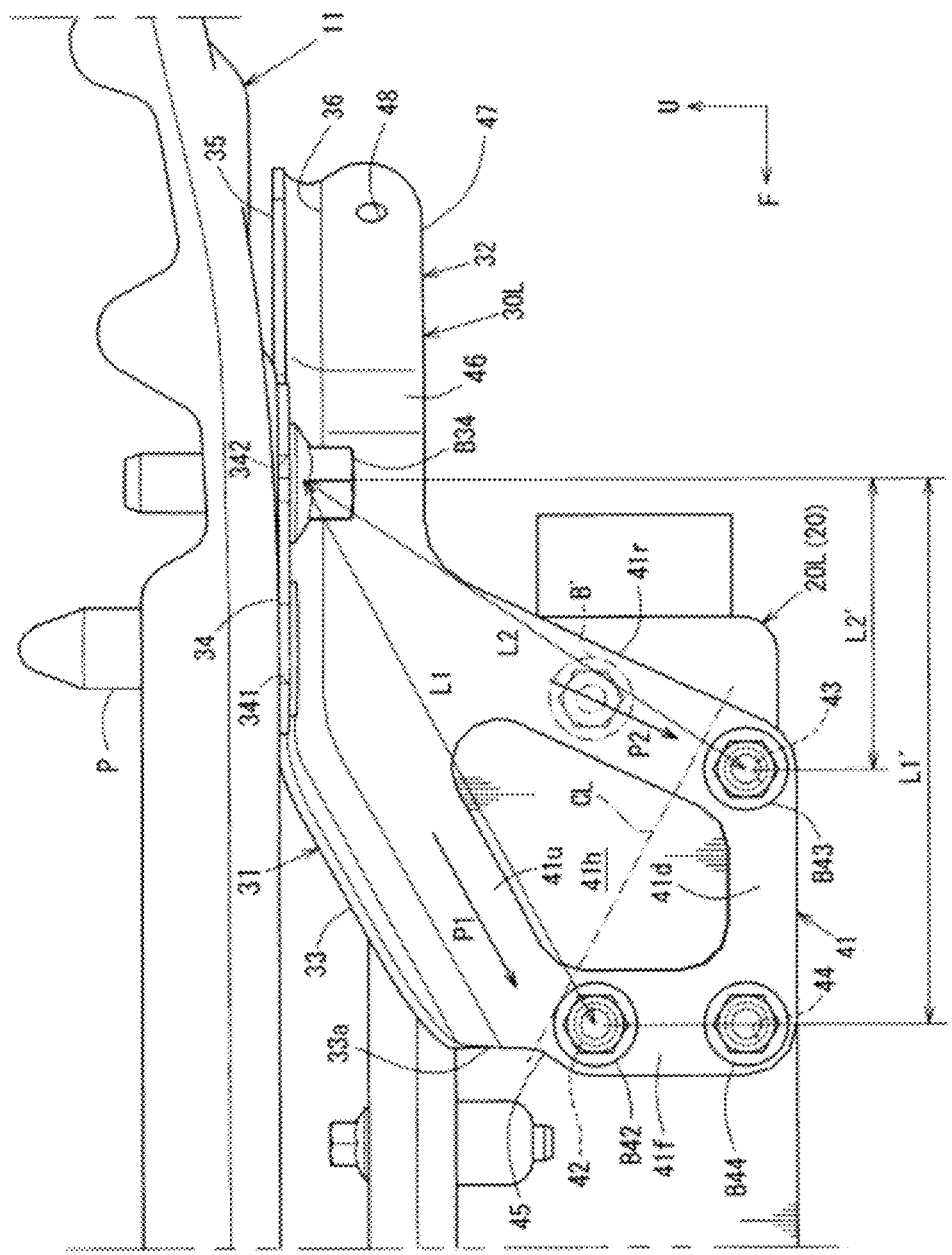
FIG. 4 is a side view of the rear-side bracket and principal components of its periphery as seen from the vehicle-width-direction outer side.
Figure 5:
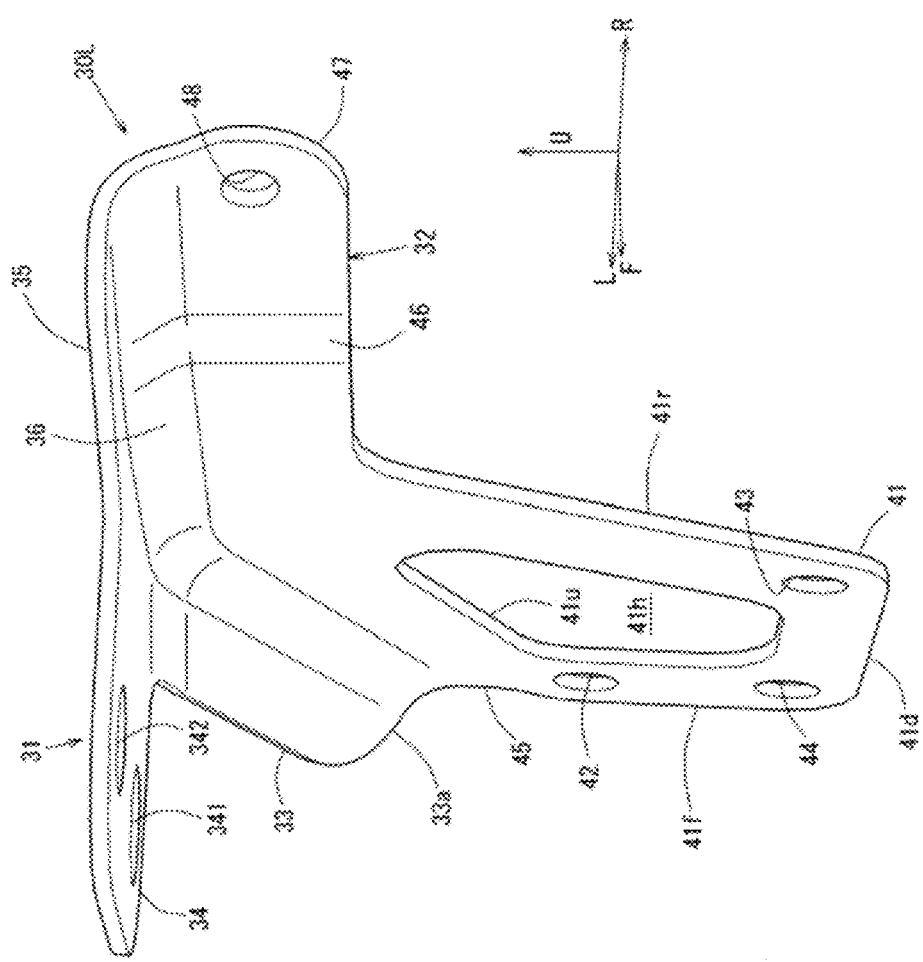
FIG. 5 is a perspective view of the rear-side bracket as seen from a vehicle rear area and the vehicle-width-direction outer side.

As illustrated in FIG. 3 to FIG. 5, the rear-side bracket 30L is integrally formed with a vehicle-width outward extension piece 31 which extends in the vehicle width direction and a downward extension piece 32 which extends downward from a vehicle-width-direction inner end of the vehicle-width outward extension piece 31 in the vehicle width direction. A bent portion 36 positioned at a corner portion between the vehicle-width outward extension piece 31 and the downward extension piece 32 is formed throughout substantially the whole length of the rear-side bracket 30L in the front-rear direction.

In the vehicle-width outward extension piece 31, a front-side flange 33 is provided to a front portion, a vehicle-body-side mounting portion 34 is provided to an intermediate portion in the front-rear direction, a rear-side flange 35 is provided to a rear portion, and those are continuously formed in the front-rear direction. Each of the front-side flange 33, the vehicle-body-side mounting portion 34, and the rear-side flange 35 extends to the vehicle-width-direction outer side and is formed in an eaves shape with respect to the downward extension piece 32. The vehicle-body-side mounting portion 34 is formed to protrude to the vehicle-width-direction outer side of the front-side flange 33 and the rear-side flange 35.

The front-side flange 33 is inclined and linearly extends from a front end of the vehicle-body-side mounting portion 34 along the bent portion 36 to be positioned lower toward the front. Meanwhile, the rear-side flange 35 extends rearward from a back end of the vehicle-body-side mounting portion 34 along the bent portion 36.

In a front-side section of the vehicle-body-side mounting portion 34, a pin insertion hole 341 is formed which passes through in the up-down direction and through which a pin P (see FIG. 3 and FIG. 4) is capable of being inserted. A rear-side section of the vehicle-body-side mounting portion 34, a bolt insertion hole 342 is formed which passes through in the up-down direction and through which a bolt B34 (see FIG. 3 and FIG. 4) is capable of being inserted.

Accordingly, the rear-side bracket 30L is positioned to the vehicle body 2 (the bottom face of the front portion 11f of the rear side frame 11) by using the pin P in the pin insertion hole 341 of the vehicle-body-side mounting portion 34. In addition, in such a positioned state, the rear-side bracket 30L is fastened and fixed to the vehicle body 2 (the bottom face) by using the bolt B34 and so forth in the bolt insertion hole 342 of the vehicle-body-side mounting portion 34. That is, the bolt B34 which is inserted through the bolt insertion hole 342 of the vehicle-body-side mounting portion 34 is formed as a vehicle-body fastening portion B34 which is fastened to the vehicle body 2.

In the downward extension piece 32 in the rear-side bracket 30L, a battery-side mounting piece 41 is formed from a front portion to an intermediate portion in the front-rear direction, a rearward extension piece 47 is formed in a rear portion, and those battery-side mounting piece 41 and the rearward extension piece 47 are continuously formed throughout the downward extension piece 32 in the front-rear direction. Each of the battery-side mounting piece 41 and the rearward extension piece 47 extends downward in a perpendicular direction from the vehicle-width-direction inner end of the vehicle-width outward extension piece 31 via the bent portion 36, and the battery-side mounting piece 41 is formed to protrude to a lower area than the rearward extension piece 47.

In a vehicle side view, the above-described rearward extension piece 47 substantially horizontally extends from a base portion of the battery-side mounting piece 41 (that is, a joint portion between an upper edge side 41u and a rear edge side 41r, which will be described later). The rearward extension piece 47 is formed while having a bent portion 46 in an intermediate portion in the front-rear direction such that a rear portion (distal end portion) is slightly directed to the vehicle-width-direction inner side with respect to a front portion (base portion). In the rear portion of the rearward extension piece 47, a through hole 48 for mounting a harness is formed.

As illustrated in FIG. 3 to FIG. 5, the battery-side mounting piece 41 is integrally formed to include the upper edge side 41u which is inclined and substantially linearly extends in an upper edge of the battery-side mounting piece 41 to be positioned lower toward the front in a vehicle side view, the rear edge side 41r which is inclined and linearly extends in a rear edge of the battery-side mounting piece 41 at a steeper slope than the upper edge side 41u to be positioned lower toward the front in a vehicle side view, a front edge side 41f which linearly extends downward in the perpendicular direction from a front lower end of the upper edge side 41u, and a lower edge side 41d which linearly extends in the front-rear direction to connect together a front lower end of the rear edge side 41r and a lower end of the front edge side 41f. Because the lower end of the front edge side 41f and the front lower end of the rear edge side 41r are positioned at substantially the same height, the lower edge side 41d extends horizontally in the front-rear direction.

In other words, in a center portion of the battery-side mounting piece 41 in a side view, a hole portion 41h is formed which passes through the battery-side mounting piece 41 in the vehicle width direction (plate-thickness direction). The hole portion 41h is defined by the upper edge side 41u, the rear edge side 41r, the front edge side 41f, and the lower edge side 41d which are positioned in an outer periphery of the battery-side mounting piece 41.

In the above-described battery-side mounting piece 41, plural (three in this example) bolt insertion holes 42, 43, and 44 are formed which pass through in the vehicle width direction (plate thickness direction) and through which bolts B42, B43, and B44 are capable of being inserted.

The bolt insertion hole 42 is formed in an upper portion of the front edge side 41f of the battery-side mounting piece 41, the bolt insertion hole 43 is formed in a lower end portion of the rear edge side 41r (a corner portion between the rear edge side 41r and the lower edge side 41d) in the battery-side mounting piece 41, the bolt insertion hole 44 is formed in a lower end portion of the front edge side 41f (a corner portion between the front edge side 41f and the lower edge side 41d) in the battery-side mounting piece 41, and those are respectively set as a first bolt insertion hole 42, a second bolt insertion hole 43, and a third bolt insertion hole 44.

Furthermore, as illustrated in FIG. 3 and FIG. 4, the above-described rear-side bracket 30L is fastened and fixed to the side surface of the battery case 22 on the vehicle-width-direction outer side by using the bolts B42, B43, and B44 and so forth in the respective bolt insertion holes 42, 43, and 44 of the battery-side mounting piece 41. That is, the bolt B42 which is inserted through the first bolt insertion hole 42 is formed as a first battery fastening portion B42 which is fastened to the battery case 22. Similarly, the bolt B43 which is inserted through the second bolt insertion hole 43 is formed as a second battery fastening portion B43 which is fastened to the battery case 22, and the bolt B44 which is inserted through the third bolt insertion hole 44 is formed as a third battery fastening portion B44 which is fastened to the battery case 22.

Each of the first to third battery fastening portions B42, B43, and B44 is positioned lower than the vehicle-body fastening portion B34. Further, the first battery fastening portion B42 and the third battery fastening portion B44 is positioned in front of the second battery fastening portion B43, and the second battery fastening portion B43 and the third battery fastening portion B44 are positioned below the first battery fastening portion B42.

In addition, the third battery fastening portion B44 is positioned immediately below the first battery fastening portion B42 and is positioned at substantially the same height as the second battery fastening portion B43.

Figure 6:
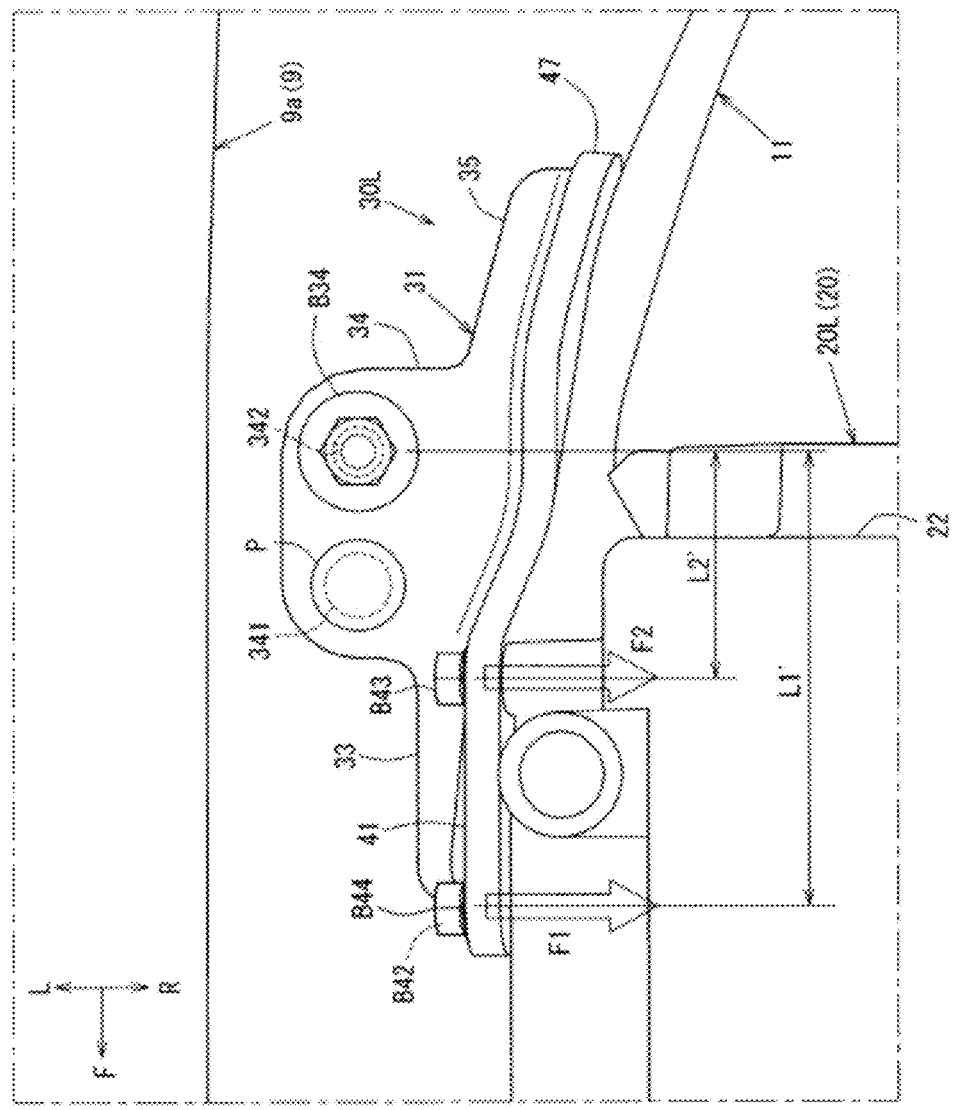
FIG. 6 is an enlarged view illustrating a region X in FIG. 1.

Further, as illustrated in FIG. 4 and FIG. 6, the first and second battery fastening portions B42 and B43 are provided such that a front-rear direction length L1' between the vehicle-body fastening portion B34 and the first battery fastening portion B42 (the length L1' of a front-rear direction component of a length L1 between the vehicle-body fastening portion B34 and the first battery fastening portion B42) becomes longer than a front-rear direction length L2' between the vehicle-body fastening portion B34 and the second battery fastening portion B43 (the length L2' of a front-rear direction component of a length L2 between the vehicle-body fastening portion B34 and the second battery fastening portion B43).

In addition, the battery-side mounting piece 41 of the rear-side bracket 30L is configured to be capable of being fractured when an inward collision load in the vehicle width direction is input from the left side of the vehicle 1 to a position in front of the position of the center of gravity of the first battery unit 20L (for example, the position corresponding to the center pillar 12 (see FIG. 2) in the front-rear direction) (in other words, when a side collision from the left side of the vehicle 1 occurs).

Specifically, as illustrated in FIG. 3 to FIG. 5, a constricted portion 45 as a strength lowered portion is formed in a vicinity section in the first battery fastening portion B42 to the vehicle-body fastening portion B34 side (in this example, a corner portion (boundary portion) between the upper edge side 41u and the front edge side 41f).

Specifically, in the constricted portion 45, at least one edge portion, in a width direction, of the vicinity section in the first battery fastening portion B42 to the vehicle-body fastening portion B34 side (in this example, an edge portion in front of and above the corner portion between the upper edge side 41u and the front edge side 41f) is formed in a shape recessed rearward and downward. Accordingly, the constricted portion 45 is formed, as a strength lowered portion, to locally have a small width compared to a peripheral portion and is formed as a fragile portion (small width portion) to be preferentially fractured in a side collision.

Here, in a side collision from the left side of the vehicle 1, behavior occurs where the side sill 9 or the like as a frame member (outside frame member) positioned on the vehicle-width-direction outer side (in this example, the left side of the vehicle 1) of the first battery unit 20L is subjected to bending deformation to the vehicle-width-direction inner side and pushes the front portion of the first battery unit 20L into the vehicle-width-direction inner side. In response to that, the rear portion of the first battery unit 20L is pulled to the vehicle-width-direction outer side by the front portion 11f of the rear side frame 11 via the rear-side bracket 30L.

Due to this, in the rear-side bracket 30L, between the first and second battery fastening portions B42 and B43 and the vehicle-body fastening portion B34, respective load transmission paths are configured which connect those in the shortest lengths.

As illustrated in FIG. 4, between those load transmission paths, the load transmission path between the first battery fastening portion B42 and the vehicle-body fastening portion B34 is set as a first load transmission path P1, and the load transmission path between the second battery fastening portion B43 and the vehicle-body fastening portion B34 is set as a second load transmission path P2.

That is, the first load transmission path P1 is formed along the upper edge side 41u of the battery-side mounting piece 41, and the second load transmission path P2 is formed along the rear edge side 41r of the battery-side mounting piece 41.

Here, the front-side flange 33 extends in an upper edge of the first load transmission path P1 which is formed along the upper edge side 41u of the battery-side mounting piece 41.

However, a front lower end 33a (an end portion on the first battery fastening portion B42 side) in the front-side flange 33 is positioned in an edge portion above and in the rear of the constricted portion 45. That is, the front-side flange 33 extends forward along the first load transmission path P1 to the edge portion above and in the rear of the constricted portion 45. Thus, above the constricted portion 45, the front-side flange 33 is not formed.

Next, a description will be made, by using FIG. 7 about behavior in a case where, as described above, in a side collision, a tension load to the vehicle-width-direction outer side is input to the rear-side bracket 30L of the present disclosure and the rear-side bracket 30L is thereby fractured.

Figure 7:
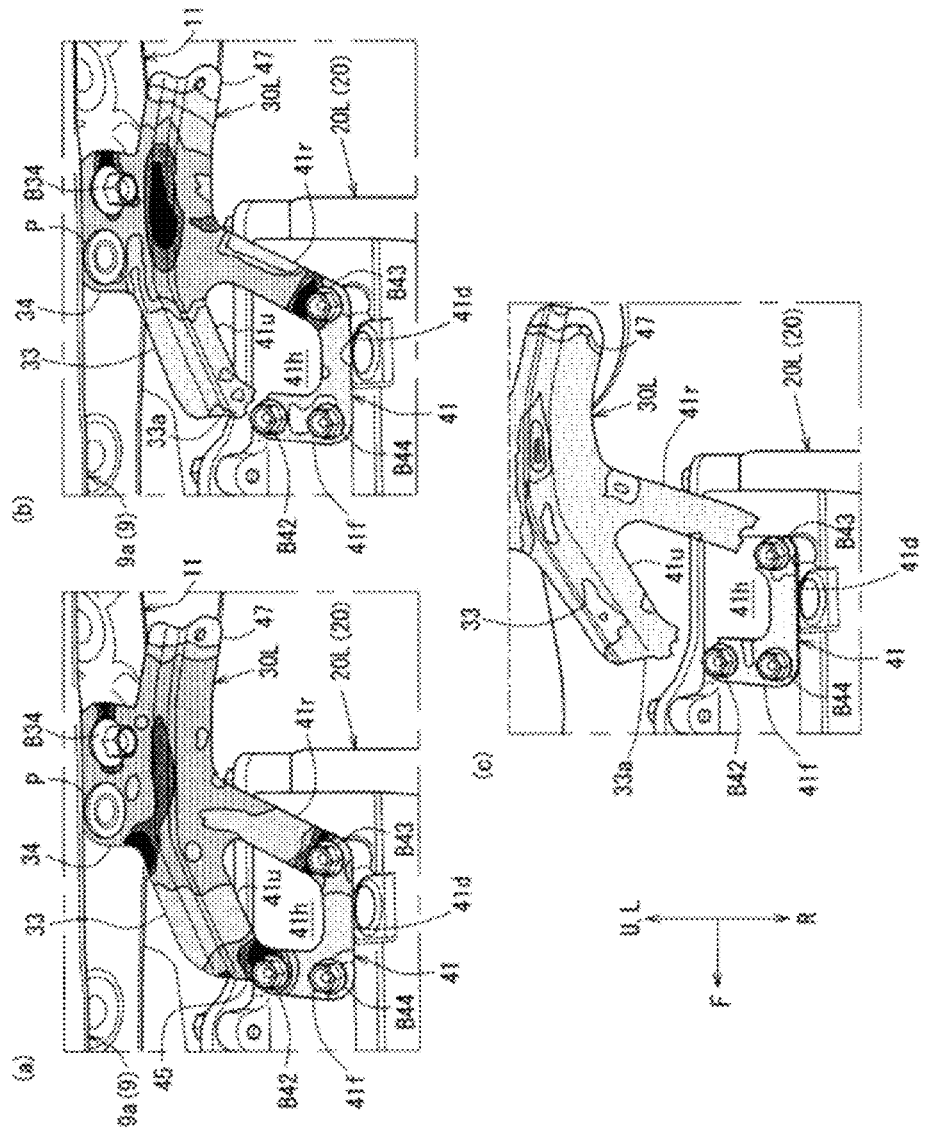
FIG. 7 is a perspective view which, in a manner corresponding to FIG. 3, illustrates results of a simulation analysis of transition in behavior of the rear-side bracket in a side collision.

FIG. 7 is a perspective view which, in a manner corresponding to FIG. 3, illustrates results of a simulation analysis of behavior of the rear-side bracket 30L in a side collision. FIG. 7(a) illustrates a side collision early period, FIG. 7(b) illustrates a side collision intermediate period, and FIG. 7(c) illustrates a side collision later period.

Note that FIG. 7(a), FIG. 7(b), and FIG. 7(c) illustrate the distribution of bending stress (moment load) in each portion of the rear-side bracket 30L based on shades by dots and illustrate that a portion with denser dots has high bending stress.

First, in a side collision, a tension load to the vehicle-width-direction outer side is input from the vehicle body 2 to the vehicle-body fastening portion B34 of the rear-side bracket 30L. In other words, as illustrated in FIG. 6, a load F1 by which the first battery fastening portion B42 is pulled to a vehicle-width inner side and a load F2 by which the second battery fastening portion B43 is pulled to the vehicle width inner side are input from the first battery unit 20L.

Specifically, a load input from the vehicle-body fastening portion B34 to the rear-side bracket 30L is transmitted to the first battery fastening portion B42 along the first load transmission path P1 and is transmitted to the second battery fastening portion B43 along the second load transmission path P2.

Here, as described above, the front-rear direction length L1' (also referred to as "front moment length L1'") between the vehicle-body fastening portion B34 and the first battery fastening portion B42 is set longer than the front-rear direction length L2' (also referred to as "rear moment length L2'") between the vehicle-body fastening portion B34 and the second battery fastening portion B43.

Thus, when the tension load to the vehicle-width-direction outer side is input from the vehicle body 2 to the vehicle-body fastening portion B34 of the rear-side bracket 30L in the side collision early period, a larger moment acts on the first battery fastening portion B42 than the second battery fastening portion B43.

Accordingly, as illustrated in FIG. 7(a), in the side collision early period, stress (moment load) can be concentrated more in the vicinity of the first battery fastening portion B42 than the vicinity of the second battery fastening portion B43.

Here, because, in the rear-side bracket 30L, the tension load acting on the rear-side bracket 30L in a side collision causes stress to be concentrated in the vicinities in the first battery fastening portion B42 and the second battery fastening portion B43 to the vehicle-body fastening portion B34 side, as illustrated in FIG. 4, those can be fractured along a fracturing line CL which linearly connects those together.

Furthermore, the second battery fastening portion B43 is set to be positioned below the first battery fastening portion B42, and the fracturing line CL can thereby be set as a linear shape extending in an upper-front-to-lower-rear direction as illustrated in FIG. 4.

On the other hand, as illustrated in FIG. 4, in a case where a fastening portion B' is hypothetically present in a predetermined position between the vehicle-body fastening portion B34 and the second battery fastening portion B43, stress to be more actively transmitted from the vehicle body 2 side (the vehicle-body fastening portion B34 side) to the first battery fastening portion B42 than the second battery fastening portion B43 is also dispersed to the fastening portion B' in addition to the first battery fastening portion B42 and the second battery fastening portion B43. Then, stress which should basically be transmitted to the first battery fastening portion B42 becomes small, and the rear-side bracket 30L might not be capable of being detached from the first battery unit 20L at a desired timing.

Thus, as described above, the fracturing line CL is set as the linear shape extending in the upper-front-to-lower-rear direction, and further a configuration is made such that another fastening portion such as the fastening portion B' is not provided on the vehicle-body fastening portion B34 side of the fracturing line CL between the vehicle-body fastening portion B34 and the second battery fastening portion B43 (see FIG. 4). Accordingly, in the side collision early period, stress can be concentrated in the first battery fastening portion B42.

In addition, as illustrated in FIG. 3 and FIG. 4, as described above, the constricted portion 45 is provided in the vicinity section in the first battery fastening portion B42 to the vehicle-body fastening portion B34 side. Thus, stress can be concentrated in the constricted portion 45 in the vicinity of the first battery fastening portion B42 (see the dotted region in FIG. 7(a) which corresponds to the constricted portion 45).

Thus, as illustrated in FIG. 7(b), in the side collision intermediate period, the constricted portion 45 is fractured in which stress is concentrated, as described above, in the vicinity of the first battery fastening portion B42. Accordingly, because stress is concentrated in the vicinity of the second battery fastening portion B43, in the side collision later period, as illustrated in FIG. 7(c), the vicinity of the second battery fastening portion B43 is fractured.

In short, the rear-side bracket 30L is configured to stepwise fracture the vicinity of the first battery fastening portion B42 and the vicinity of the second battery fastening portion B43 in a side collision and to thereby certainly fracture both of those.

As illustrated in FIG. 1 and FIG. 2, the above-described lower structure for the vehicle includes the first battery unit 20L (battery unit) provided under the floor panel 4 constituting the vehicle body floor, a frame member which extends in the front-rear direction on the vehicle-width-direction outer side of the first battery unit 20L and which will be described later, the high-voltage cable 14 which extends forward from the front portion of the first battery unit 20L, and the rear-side bracket 30L as a fixing member which fixes the rear portion of the first battery unit 20L to a frame member.

In addition, as illustrated in FIG. 1 and FIG. 2, the lower structure for the vehicle 1 includes the side sills 9 and the floor frames 10 and rear side frames 11 which are adjacent to the side sills 9 on the vehicle-width-direction inner sides and extend in the front-rear direction. The floor frame 10 is provided in front of the rear side frame 11, the back end of the floor frame 10 and the front portion 11f of the rear side frame 11 are joined to each other, and the rear portion of the first battery unit 20L is fixed to the front portion 11f of the rear side frame 11 as a frame member via the rear-side bracket 30L.

Furthermore, the lower structure for the vehicle 1 is characterized in that the rear-side bracket 30L is configured to be capable of being fractured when an inward collision load in the vehicle width direction is input to a position in front of the position of the center of gravity of the first battery unit 20L.

In the above configuration, because rotation behavior of the first battery unit 20L can be inhibited in a side collision, an excessive tension can be inhibited from being exerted on the high-voltage cable 14 which extends forward from the front portion of the first battery unit 20L.

Figure 8:
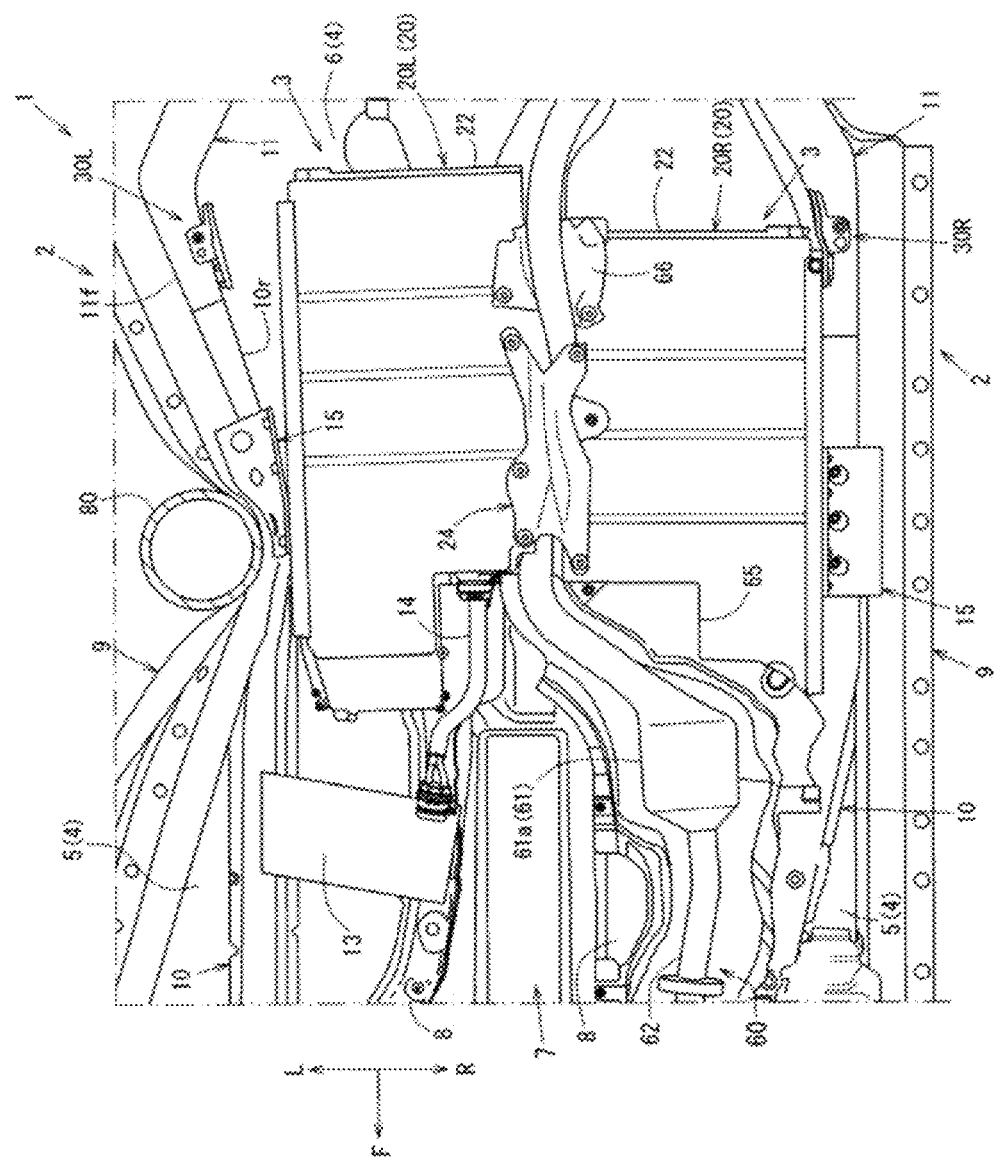
FIG. 8 is a bottom view illustrating a state of the lower structure for a vehicle in a side collision.

In detail, when from a normal (ordinary) state illustrated in FIG. 1, as illustrated in FIG. 8, a collision object 80 such as a pole collides, inward in the vehicle width direction from the vehicle-width-direction outer side (in this example, the left side of the vehicle body 2), with the vehicle body 2 in a front area of the vehicle 1 relative to the position of the center of gravity of the first battery unit 20L, the side sill 9 deforms in a V-shape in a vehicle planar view.

Then, because the front portion 11f of the rear side frame 11 which is positioned in the rear of a collision position of the collision object 80 is likely to be displaced to the vehicle-width-direction inner side toward the front, a tension load to the vehicle-width-direction outer side is input from the rear side frame 11 (vehicle body 2) side to the rear-side bracket 30L fixed to the front portion 11f of the rear side frame 11.

Figure 9:
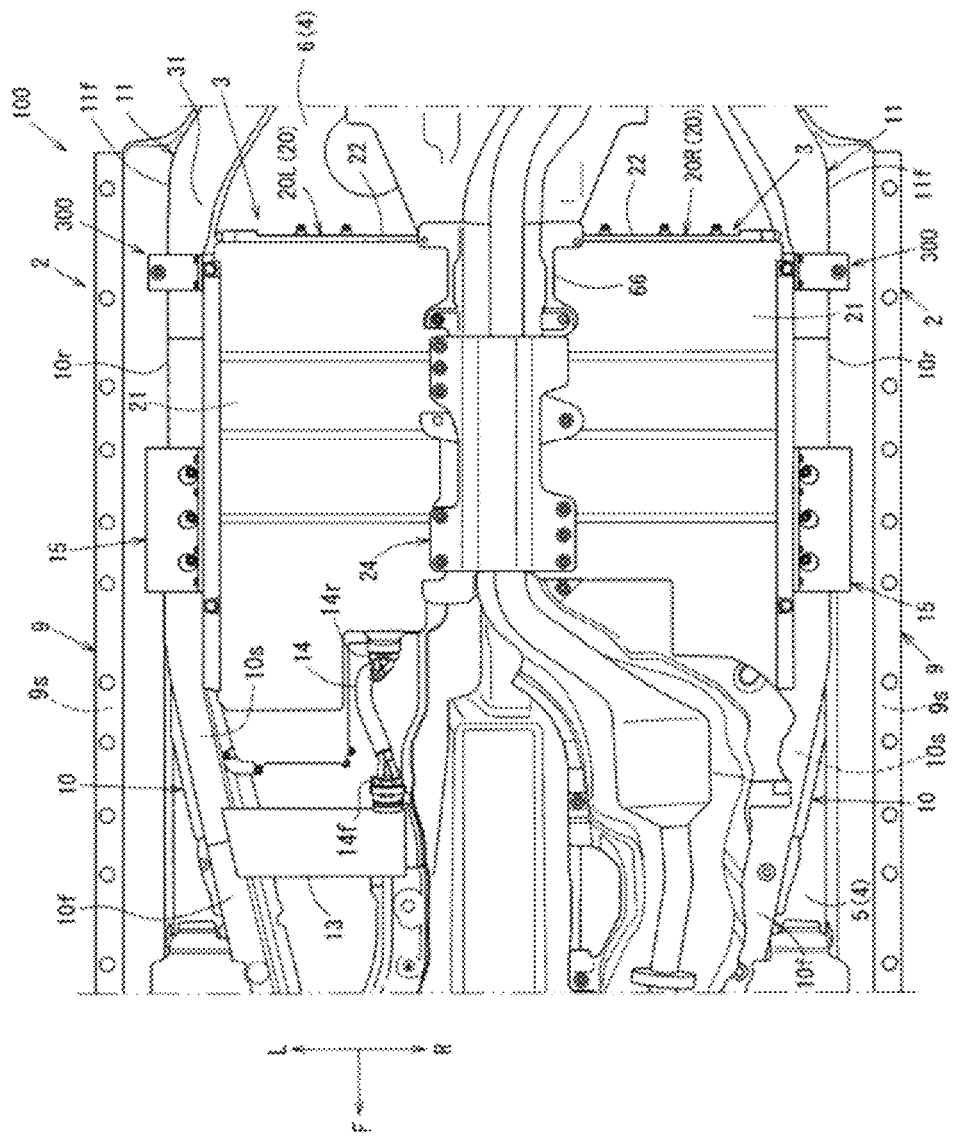
FIG. 9 is a bottom view illustrating a lower structure for a vehicle of a comparative example.

Here, a rear-side bracket 300 included in a lower structure 100 for a vehicle in a prior art example (comparative example) as illustrated in FIG. 9 is formed strong while priority is given to durability (rigidity) against a vibration input from the first battery unit 20L in usual traveling. Thus, in the lower structure 100 for a vehicle in the prior art, even when a tension load to the vehicle-width-direction outer side is input from the vehicle body 2 side as described above in a side collision, as illustrated in FIG. 10, the first battery unit 20L and the front portion 11f of the rear side frame 11 are maintained in a state where those are fixed to each other via the rear-side bracket 300.

In this case, in a side collision, the rear portion of the first battery unit 20L is likely to be displaced to the vehicle-width-direction outer side following deformation of the front portion 11f of the rear side frame 11 in which the front portion 11f is inclined to the vehicle-width-direction inner side toward the front.

Figure 10:
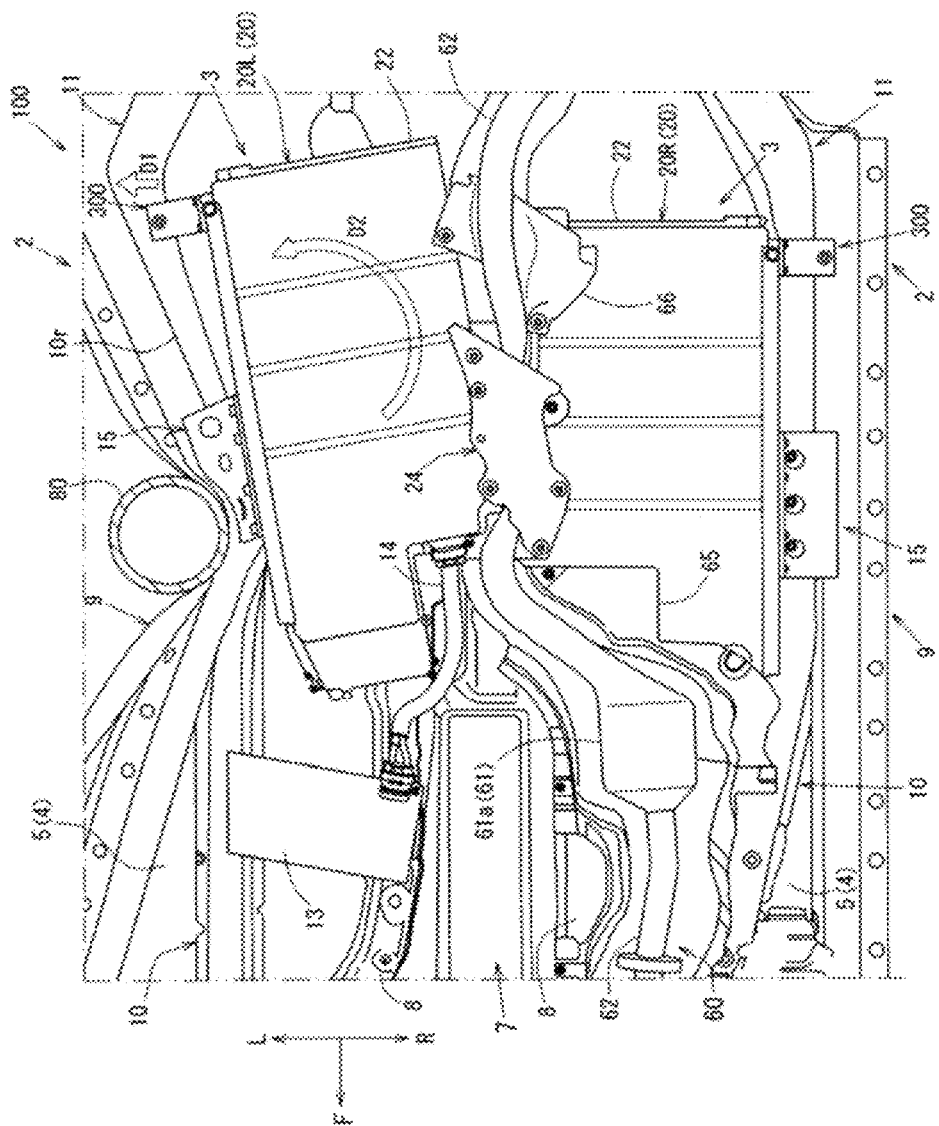
FIG. 10 is a bottom view illustrating a state of the lower structure for a vehicle of the comparative example in a side collision.

That is, as illustrated in FIG. 10, the front portion of the first battery unit 20L is pushed into the vehicle-width-direction inner side due to an inward collision by the collision object 80 in the vehicle width direction, the tunnel portion 7 is thereby subjected to compressive deformation in the vehicle width direction, the rear portion of the first battery unit 20L is pulled to the vehicle-width-direction outer side by the front portion 11f of the rear side frame 11 via the rear-side bracket 30L (see an arrow D1 in FIG. 10), and the first battery unit 20L thereby exhibits behavior of rotating counterclockwise in a bottom view (see an arrow D2 in FIG. 10). In such a case, it is concerned that in response to the rotation behavior of the first battery unit 20L, a tension load is exerted on the high-voltage cable 14 which extends forward from the front portion of the first battery unit 20L.

On the other hand, in the lower structure for the vehicle 1, as illustrated in FIG. 8, the rear-side bracket 30L is configured to be fractured by an input, from the vehicle body 2 side, of a tension load to the vehicle-width-direction outer side in a side collision from the left side of the vehicle 1. Thus, the rear portion of the first battery unit 20L can be detached from the front portion 11f of the rear side frame 11 (vehicle body 2) (see FIG. 8).

Thus, in a side collision, the rear portion of the first battery unit 20L is not pulled to the vehicle-width-direction outer side by the side sill 9 and so forth via the rear-side bracket 30L and does not follow deformation in rear portions of the side sill 9 and so forth in which the rear portions are inclined to the vehicle-width-direction inner side toward the front.

Consequently, in a side collision, counterclockwise rotation behavior of the first battery unit 20L in which the front portion is more largely displaced to the vehicle-width-direction inner side than the rear portion can be inhibited, and a tension load can be inhibited from being exerted on the high-voltage cable 14, which extends forward from the front portion of the first battery unit 20L, in response to the rotation behavior.

In addition, because the high-voltage cable 14 extending forward does not have to be formed excessively long by being provided with an extra length portion for an actual length taking exertion of a tension load in a side collision into consideration, an increase in an electric resistance of the high-voltage cable 14 can be inhibited.

As illustrated in FIG. 3 and FIG. 4, as a form of a working example of the present disclosure, the rear-side bracket 30L is configured to have the vehicle-body fastening portion B34, the first and second battery fastening portions B42 and B43 which are positioned below the vehicle-body fastening portion B34 and are spaced apart in the front-rear direction, and the hole portion 41h which is formed between the first battery fastening portion B42 and the second battery fastening portion B43.

In the above configuration, the load transmission paths P1 and P2 (see FIG. 4) of loads transmitted from the vehicle-body fastening portion B34 to the first battery unit 20L side can be divided into both sides across the hole portion 41h provided between the first battery fastening portion B42 and the second battery fastening portion B43. Thus, in a side collision, a load input from the vehicle body 2 to the rear-side bracket 30t via the vehicle-body fastening portion B34 is not dispersed between the first battery fastening portion B42 and the second battery fastening portion B43 but can be concentrated in the vicinities of those battery fastening portions B42 and B43.

Further, because the hole portion 41h contributes to lowering of strength of the vicinities of the first and second battery fastening portions B42 and B43, a portion between the first battery fastening portion B42 and the second battery fastening portion B43 is stretched in a side collision, and the vicinities of the first and second battery fastening portions B42 and B43 are thereby not hindered from being fractured.

Consequently, in a side collision, the vicinity of the first battery fastening portion B42 and the vicinity of the second battery fastening portion B43 can certainly be fractured.

As illustrated in FIG. 4, as a form of a working example of the present disclosure, the first battery fastening portion B42 is configured to be positioned in front of the second battery fastening portion B43, the front-rear direction length L1' between the vehicle-body fastening portion B34 and the first battery fastening portion B42 is configured to be longer than the front-rear direction length L2' between the vehicle-body fastening portion B34 and the second battery fastening portion B43.

That is the front moment length L1' is set longer than the rear moment length L2'.

In a side collision, because the rear-side bracket 30L is pulled to the vehicle-width-direction outer side by the vehicle body 2, a tension load F1 to the vehicle-width-direction inner side acts on the first battery fastening portion B42, and a tension load F2 to the vehicle-width-direction inner side acts on the second battery fastening portion B43 (see FIG. 6).

Thus, in the above configuration, in a side collision, because a moment load can more be concentrated in the vicinity of the first battery fastening portion B42 than the vicinity of the second battery fastening portion B43, the vicinity of the first battery fastening portion B42 and the vicinity of the second battery fastening portion B43 can stepwise be fractured in this order.

Consequently, in a side collision, both of the vicinity of the first battery fastening portion B42 and the vicinity of the second battery fastening portion B43 can certainly be fractured.

As illustrated in FIG. 3 and FIG. 4, as a form of a working example of the present disclosure, the second battery fastening portion B43 is configured to be positioned below the first battery fastening portion B42.

In the above configuration, as illustrated in FIG. 4, the desired fracturing line CL of the rear-side bracket 30L fractured by a tension load acting on the rear-side bracket 30L in a side collision can be set as a straight line which connects together, in the upper-front-to-lower-rear direction, the respective vicinities in the first battery fastening portion B42 and the second battery fastening portion B43 to the vehicle-body fastening portion B34 side.

That is, as described above, the second battery fastening portion B43 is positioned below the first battery fastening portion B42, and the rear-side bracket 30L is thereby configured such that the fastening portion B' is not provided in a position between the vehicle-body fastening portion B34 and the second battery fastening portion B43, that is, on the vehicle-body fastening portion B34 side of the fracturing line CL (see FIG. 4). Accordingly, in a side collision, stress is not dispersed to the fastening portion B', but stress can be concentrated in the first battery fastening portion B42.

As illustrated in FIG. 3 and FIG. 5, as a form of a working example of the present disclosure, the constricted portion 45 as a strength lowered portion is provided in the vicinity in the first battery fastening portion B42 to the vehicle-body fastening portion B34 side, the constricted portion 45 being formed to have the smallest path width in the first load transmission path P1 (load transmission path) which connects together the vehicle-body fastening portion B34 and the first battery fastening portion B42 in the shortest length (see FIG. 4).

In the above configuration, in a side collision, the vicinity of the first battery fastening portion B42 can certainly and easily be fractured, and a section to be fractured can easily be controlled.

As illustrated in FIG. 3 to FIG. 5, as a form of a working example of the present disclosure, the rear-side bracket 30L is configured to include the front-side flange 33 (flange portion) which is formed to bend with respect to the first load transmission path P1 along an upper edge (at least one edge portion) of the first load transmission path P1 in a path width direction (a direction orthogonal to the first load transmission path P1 in a side view), and the front lower end 33a (the end portion on the first battery fastening portion B42 side) in the front-side flange 33 is configured to be positioned in the vicinity of the constricted portion 45.

In the above configuration, because, in the first load transmission path P1, a rigidity difference is present between the vicinity of the first battery fastening portion P42 and the other portions, in a side collision, the vicinity of the first battery fastening portion B42 can certainly be fractured.

Further, durability (rigidity) against a vibration input from the first battery unit 201, in usual traveling can be enhanced.

Consequently, achievement of both of certain fracture of the vicinity of the first battery fastening portion B42 in a side collision and durability against a vibration input from the first battery unit 201, in usual traveling can be intended.

The present disclosure is not limited only to the configurations of the above-described working examples but can be formed as various embodiments.

For example, a frame member is not limited to the rear side frame 11 as in the above-described embodiment as long as a rear portion of the battery unit 20 is capable of being mounted on the frame member via the rear-side bracket 30L, and at least one of the side sill 9 and the floor frame 10 may be used, for example.

Further, a strength lowered portion of the present disclosure is not limited to formation as the constricted portion 45 as in the above-described embodiment, and a section in the first load transmission path P1 which is formed to have the thinnest thickness, a section provided with a hole portion (a through hole or a non-through hole), or a configuration formed by combining at least two of those can be employed.

Further, in the above-described embodiment, the first battery unit 20L on the left side of the vehicle 1 is provided with the inverter 13 as a high-voltage device; however, this is not restrictive, and a high-voltage device may be provided to the second battery unit 20R on a right side of the vehicle 1. In such a case, a fixing member (rear-side bracket 30L) of the present disclosure can be provided to a right side of a vehicle.

Further, application of the present disclosure is not limited to a plug-in hybrid automobile (PHEV) as the vehicle 1 as long as a vehicle includes a motor and an engine, and application may be made to other vehicles such as a hybrid automobile (HV) and an electric automobile with a range extension function (range extender) (REEV), for example.

What is claimed is:

1. A lower structure for the vehicle, the lower structure comprising:
    a battery unit, the battery unit including a battery case and a battery disposed in the battery case where the battery is configured to store electrical energy that the vehicle uses to travel, which is provided under a floor panel constituting a vehicle body floor;
    a frame member which extends in a front-rear direction on a vehicle-width-direction outer side of the battery unit;
    a high-voltage cable which extends forward from a front portion of the battery unit;
    a fixing member which fixes a rear portion of the battery unit to the frame member, wherein
    the fixing member is configured to fracture when an inward collision load in a vehicle width direction is input to a position in front of a position of a center of gravity of the battery unit;
    a side sill which extends in the front-rear direction on a vehicle-width-direction outer side of the floor panel; and
    a floor frame and a rear side frame which are adjacent to the side sill on a vehicle-width-direction inner side and extend in the front-rear direction, wherein
    the floor frame is provided in front of the rear side frame, a rear portion of the floor frame and a front portion of the rear side frame are joined to each other,
    the frame member is at least one of the floor frame and the rear side frame,
    the fixing member has a vehicle-body fastening portion, first and second battery fastening portions which are spaced apart in the front-rear direction, and a hole portion which is formed between the first battery fastening portion and the second battery fastening portion, the first battery fastening portion is positioned in front of the second battery fastening portion, a front-rear direction length between the vehicle-body fastening portion and the first battery fastening portion is longer than a front-rear direction length between the vehicle-body fastening portion and the second battery fastening portion, and the second battery fastening portion is positioned below the first battery fastening portion.

2. The lower structure for the vehicle according to claim 1, wherein the frame member is a side sill which extends in the front-rear direction on a vehicle-width-direction outer side of the floor panel.

3. The lower structure for the vehicle according to claim 1, wherein a strength lowered portion is provided adjacent to the first battery fastening portion to a side of the vehicle-body fastening portion.

4. The lower structure for the vehicle according to claim 3, wherein the strength lowered portion is a section in a load transmission path which connects together the vehicle-body fastening portion and the first battery fastening portion in a shortest length, the section being formed to have a smallest path width and/or a thinnest thickness.

5. The lower structure for the vehicle according to claim 4, wherein the fixing member includes a flange portion which is formed to bend with respect to the load transmission path along at least one edge portion of the load transmission path in a path width direction, and an end portion in the flange portion on a side of the first battery fastening portion is positioned adjacent to the strength lowered portion.

6. The lower structure for the vehicle according to claim 1, wherein the fixing member has a vehicle-body fastening portion, first and second battery fastening portions which are spaced apart in the front-rear direction, and a hole portion which is formed between the first battery fastening portion and the second battery fastening portion.

7. The lower structure for the vehicle according to claim 6, wherein a strength lowered portion is provided adjacent to the first battery fastening portion to a side of the vehicle-body fastening portion.

8. The lower structure for the vehicle according to claim 2, wherein the fixing member has a vehicle-body fastening portion, first and second battery fastening portions which are spaced apart in the front-rear direction, and a hole portion which is formed between the first battery fastening portion and the second battery fastening portion.

\* \* \* \* \*